Patented Aug. 23, 1927.

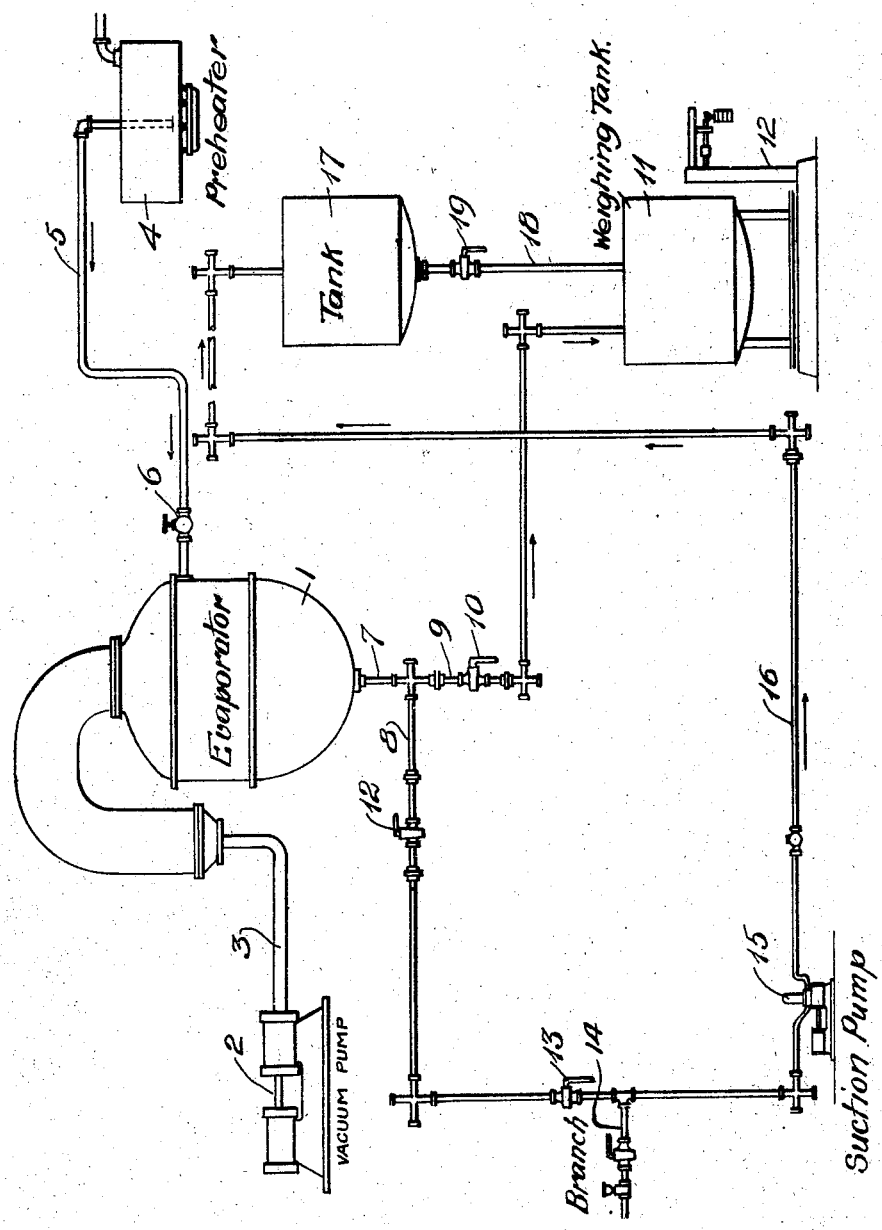

1,640,271

UNITED STATES PATENT OFFICE.

RICHARD M. GARRETT, OF YONKERS, NEW YORK, ASSIGNOR TO NESTLE'S FOOD COMPANY, OF NEW YORK, N. Y., A CORPORATION OF NEW YORK.

APPARATUS FOR CONDENSING MILK.

Application filed October 14, 1922. Serial No. 594,663.

This invention relates to improvements in apparatus for condensing milk and the primary object of the invention is to furnish an apparatus for the continuous condensing of milk. It has been found in practice that the continuous condensing of milk improves the quality of the latter as the milk is held in the vacuum pan less time and is therefore subjected to less heat.

Prior to the present invention, milk has been condensed generally by what is known as the batch process and in such process the heavy milk descends to the bottom of the pan and lays more or less idle against the heating surfaces, until the batch is completed. This sometimes causes the milk to discolor and in many cases a cooked flavor is imparted to the milk.

With the apparatus forming the present invention milk may be condensed with much less heat application in the pan, as the milk does not lay idle against the hot coils, but simply passes through the pan, the vapor being taken off as it passes through. Owing to the fact that the milk may be driven off from the vacuum pan in the present process without stopping the operation of the pan, a saving of about thirty to forty minutes in time is made as it is not necessary to shut down between batches.

With the foregoing objects outlined, and with other objects in view which will appear as the description proceeds, the invention consists in the novel features hereinafter described in detail, illustrated in the accompanying drawing and more particularly pointed out in the appended claim.

The drawing shows a diagrammatic view of the improved apparatus.

In the drawing, 1 designates a vacuum pan which may be of any suitable construction, and in which the vacuum is maintained by means of a vacuum pump 2, connected to the pan by means of a pipe 3. 4 designates a preheater or hot well in which the milk to be condensed is preheated, and from which the milk is drawn by way of the pipe 5 having a control valve 6. The milk is drawn through the pipe 5 by means of the vacuum created in the pan 1.

The lower end of the vacuum pan is connected to a conduit 7 having branches 8 and 9. The branch 9 has a control valve 10 and extends to a weighing tank 11 mounted on a suitable scale 12.

If it is desired to employ the present apparatus for the batch process, the milk may be withdrawn at intervals from the pan 1 by breaking the vacuum in the pan 1, opening the valve 10 and allowing the milk to flow by gravity into the tank 11.

When the continuous process is employed, however, the milk is withdrawn through the pipe 8, which has control valves 12 and 13 and a priming connection 14. The pipe 8 is connected to the suction branch of a pump 15, the pressure branch 16 of which discharges into a holder or receiving tank 17, the latter tank being connected to the weighing tank 11 by means of a pipe 18 having a control valve 19.

In the continuous process, the pump 2 is operated to maintain a vacuum within the pan 1 and to draw the preheated milk from the preheater 4. As the milk is condensed, the pump 15 will draw the same through the pipe 8, and it is to be understood that the suction action of the pump 15 together with the weight of the milk in the pipe between the pump and the pan measured vertically, will be greater than the suction action of the vacuum pump 2, in order that said pump 15 may withdraw the milk from the pan without interference by the vacuum pump 2. The valve 6 may be regulated to insure the feeding of a desired amount of milk into the pan and the valves 12 and 13 may be regulated to provide for the withdrawal of the desired quantity of milk from the pan. The pump 15 forces the condensed milk into the tank 17 from which it may be periodically withdrawn into the weighing tank 11.

It is also practical to remove the milk from the pan continually without the aid of the pump 15, provided the outlet pipe extends below the pan sufficiently to enable the pipe to contain a column of milk of sufficient weight to overcome the outside air pressure, corresponding to the vacuum in the pan.

From the foregoing, it is believed that the construction and operation of the present apparatus may be readily understood, and it is apparent that various changes may be made in the details set forth without departing from the spirit of the invention as expressed in the claim.

What is claimed and desired to be secured by Letters-Patent is:

An apparatus for condensing milk, comprising a vacuum pan, a preheating tank, a pipe for conveying milk from the preheating tank to the vacuum pan and provided with a regulating valve, a vacuum pump having a suction branch connected to the vacuum pan for drawing the milk through said tank, pipe and regulating valve into the pan and for maintaining a vacuum in the latter, a relatively long slender discharge pipe connected at one end to the vacuum pan and having a portion extending downwardly from the latter to maintain a liquid seal for the pan, a suction pump connected to the other end of said discharge pipe and capable of withdrawing milk from the vacuum pan through the discharge pipe while the vacuum pump is in operation, and a discharge branch for the suction pump.

In testimony whereof I affix my signature.

RICHARD M. GARRETT.